United States Patent Office 2,776,947
Patented Jan. 8, 1957

2,776,947
POLYMER DISPERSIONS

Calvin E. Schildknecht, Montclair, N. J., assignor to Celanese Corporation of America, New York, N. Y., a corporation of Delaware No Drawing. Application October 31, 1952,
Serial No. 318,077

10 Claims. (Cl. 260—32.6)

This invention relates to polymer dispersions and relates more particularly to stable dispersions of copolymers of acrylonitrile and N-vinyl lactams.

An important object of the present invention is the production of stable dispersions of copolymers of acrylonitrile and N-vinyl lactams.

Other objects of this invention will be apparent from the following detailed description and claims.

According to the present invention it has been found that the copolymers of acrylonitrile and N-vinyl lactams form stable dispersions that show no tendency to precipitate or gel over extended periods of time and at reduced or elevated temperatures. These stable dispersions may be easily prepared by forming a solution of the copolymer and adding to the said solution a non-solvent for the copolymer in an amount sufficient to precipitate at least a portion of the copolymer. There is obtained directly in this manner a stable, colloidal dispersion of the copolymer. The dispersion remains stable despite the absence of any dispersing agents and even in the presence of considerable quantities of salts, acids and bases. Surprisingly enough, when it is attempted to prepare a dispersion of polyacrylonitrile in the same manner, a relatively coarse precipitate rather than a dispersion is formed.

Examples of N-vinyl lactams which may be copolymerized with the acrylonitrile in preparing the copolymers from which the dispersions of this invention are formed are N-vinyl-alpha pyrrolidone and N-vinyl valerolactam. The percentage of acrylonitrile in the copolymer depends upon the properties it is desired to obtain in the final product and may range from as low as about 70 mole percent to as high as about 99 mole percent. Best results are obtained when the percentage of acrylonitrile is between about 80 and 98 mole percent.

In preparing the stable dispersions of this invention, the copolymer may be dissolved to form a solution in a solvent such as for example, N,N-dimethylformamide, gamma butyrolactone, ethylene carbonate, sulfuric acid and aqueous sodium thiocynate. The concentration of the copolymer in the solution is not critical and may range from as little as 1.0% by weight, or even less, to 50% or more. Generally, however, the use of very dilute solutions are undesirable in that they require the addition of large quantities of non-solvent to produce the dispersions so that it is preferred to employ solutions having a concentration of the copolymer at least about 5% by weight. To the copolymer solution there is added a sufficient quantity of a non-solvent for the polymer to effect the precipitation of at least a portion of the copolymer. The non-solvent should be miscible with the polymer solvent in the proportions employed. Suitable non-solvents include, for example, water, methanol, isopropanol, ethylene glycol, glycerine acetone, and diethyl ether.

The stable dispersions may be employed as latices in the fields of plastics, rubbers, fibers and the like. They may also be employed, for example, in the compounding of adhesives, and dipping and coating compositions. To the stable dispersions there may be added other polymeric materials, gums, resins, softening agents, plasticizers, pigments, dyes, nacreous materials or other substances capable of changing the appearance or properties of the dispersions or products produced therefrom.

The following examples are given to illustrate this invention further.

Example I

To a clear solution of 5 parts by weight of a copolymer of acrylonitrile and N-vinyl pyrrolidone, containing 91 mole percent of acrylonitrile as determined by nitrogen analysis, in 189 parts by weight of N,N-dimethylformamide there is added with stirring 79 parts by weight of methanol. The low viscosity dispersion obtained deposits no precipitate on standing at room temperature for 6 months, on cooling, to about 2° C. or on heating to 60° C. The dispersion is opalescent and scatters light.

When the process is repeated with polyacrylonitrile, the polymer is precipitated completely.

Example II

A solution is prepared by dissolving 1 part of a copolymer prepared from a 90–10 mixture by weight of acrylonitrile and vinyl pyrrolidone in 10 parts by weight of gamma-butyrolactone. With shaking there is added dropwise to the solution, 10 parts of water. A stable truly colloidal dispersion results which appears bluish-white by scattered light. After 4 days storage no precipitate settles out from the dispersion.

It is to be understood that the foregoing detailed description is given merely by way of illustration and that many variations may be made therein without departing from the spirit of my invention.

Having described my invention what I desire to secure by Letters Patent is:

1. A process for the production of a stable dispersion of a copolymer of acrylonitrile and N-vinyl lactam, containing at least about 70 mole percent of acrylonitrile which comprises adding to a solution of said copolymer a sufficient quantity of a non-solvent for said copolymer, which non-solvent is miscible with the solution, to precipitate at least a portion of the copolymer as a non-settling dispersed phase capable of scattering light.

2. A process for the production of a stable dispersion of a copolymer of acrylonitrile and an N-vinyl lactam, containing at least about 70 mole percent of acrylonitrile, which comprises adding to a solution of said copolymer having a concentration of at least about 1% by weight a sufficient quantity of a non-solvent for said copolymer, which non-solvent is miscible with the solution, to precipitate at least a portion of the copolymer as a non-settling dispersed phase capable of scattering light.

3. A process for the production of a stable dispersion of a copolymer of acrylonitrile and an N-vinyl lactam, containing between about 70 and 99 mole percent of acrylonitrile, which comprises adding to a solution of said copolymer a sufficient quantity of a non-solvent for said copolymer, which non-solvent is miscible with the solution, to precipitate at least a portion of the copolymer as a non-settling dispersed phase capable of scattering light.

4. A process for the production of a stable dispersion of a copolymer of acrylonitrile and N-vinyl pyrrolidone, containing at least about 70 mole percent of acrylonitrile, which comprises adding to a solution of said copolymer a sufficient quantity of a non-solvent for said copolymer, which non-solvent is miscible with the solution, to precipitate at least a portion of the copolymer as a non-settling dispersed phase capable of scattering light.

5. A process for the production of a stable dispersion of a copolymer of acrylonitrile and N-vinyl pyrrolidone, containing at least about 70 mole percent of acrylonitrile, which comprises adding to a solution of said copolymer having a concentration of at least about 1% by weight a sufficient quantity of a non-solvent for said copolymer, which non-solvent is miscible with the solution, to precipitate at least a portion of the copolymer as a non-settling dispersed phase capable of scattering light.

6. A process for the production of a stable dispersion of a copolymer of acrylonitrile and N-vinyl pyrrolidone, containing between about 70 and 99 mole percent of acrylonitrile, which comprises adding to a solution of said copolymer in N,N-dimethyl formamide a sufficient quantity of methanol to precipitate at least a portion of the copolymer as a non-settling dispersed phase capable of scattering light.

7. A stable colloidal dispersion capable of scattering light of a copolymer of acrylonitrile and an N-vinyl lactam containing at least about 70 mole percent of acrylonitrile in a liquid dispersing medium comprising a mixture of a solvent for the copolymer and a non-solvent for the copolymer which is miscible with the solvent in such proportions that at least a portion of the copolymer is not dissolved in the mixture.

8. A stable colloidal dispersion capable of scattering light of a copolymer of acrylonitrile and N-vinyl pyrrolidone containing at least about 70 mole percent of acrylonitrile in a liquid dispersing medium comprising a mixture of a solvent for the copolymer and a non-solvent for the copolymer which is miscible with the solvent in such proportions that at least a portion of the copolymer is not dissolved in the mixture.

9. A stable colloidal dispersion capable of scattering light of a copolymer of acrylonitrile and an N-vinyl lactam containing between about 70 and 99 mole percent of acrylonitrile in a liquid dispersing medium comprising a mixture of a solvent for the copolymer and a non-solvent for the copolymer which is miscible with the solvent in such proportions that at least a portion of the copolymer is not dissolved in the mixture.

10. A stable colloidal dispersion capable of scattering light of a copolymer of acrylonitrile and N-vinyl pyrrolidone containing between about 70 and 99 mole percent of acrylonitrile in a liquid dispersing medium comprising a mixture of a solvent for the copolymer and a non-solvent for the copolymer which is miscible with the solvent in such proportions that at least a portion of the copolymer is not dissolved in the mixture.

References Cited in the file of this patent

UNITED STATES PATENTS

| 2,335,454 | Schuster | Nov. 30, 1943 |
| 2,404,713 | Houtz | July 23, 1946 |
| 2,570,237 | Hooper et al. | Oct. 9, 1951 |